(12) United States Patent
Thomas et al.

(10) Patent No.: US 8,626,940 B2
(45) Date of Patent: Jan. 7, 2014

(54) APPARATUS, AND ASSOCIATED METHOD, FOR FACILITATING CONTENT SELECTION

(75) Inventors: Edward Eric Thomas, Kanata (CA); Grant McSheffrey, Ottawa (CA)

(73) Assignee: BlackBerry Limited (CA)

( * ) Notice: Subject to any disclaimer, the term of this patent is extended or adjusted under 35 U.S.C. 154(b) by 75 days.

(21) Appl. No.: 13/216,480

(22) Filed: Aug. 24, 2011

(65) Prior Publication Data

US 2013/0054824 A1 Feb. 28, 2013

(51) Int. Cl.
*G06F 15/16* (2006.01)

(52) U.S. Cl.
USPC ............................ 709/231; 709/224; 709/220

(58) Field of Classification Search
USPC ................... 709/231, 223–224, 203, 220
See application file for complete search history.

(56) References Cited

U.S. PATENT DOCUMENTS

| | | | |
|---|---|---|---|
| 8,214,862 B1* | 7/2012 | Lee et al. ...................... | 370/332 |
| 2003/0097408 A1* | 5/2003 | Kageyama et al. ........... | 709/205 |
| 2005/0138141 A1* | 6/2005 | Hill et al. ...................... | 709/231 |
| 2007/0220552 A1 | 9/2007 | Juster et al. | |
| 2007/0288966 A1 | 12/2007 | Javid et al. | |
| 2009/0282436 A1* | 11/2009 | Perry ............................. | 725/39 |

FOREIGN PATENT DOCUMENTS

| | | |
|---|---|---|
| CA | 2524586 A1 | 4/2007 |
| GB | 2455331 A | 6/2009 |

* cited by examiner

*Primary Examiner* — Philip B Tran
(74) *Attorney, Agent, or Firm* — Wolff & Samson PC

(57) ABSTRACT

An apparatus, and an associated method, facilitates selection of content for play out pursuant to a media service at a device having media player functionality. A set of content streams are identified together with exemplars. Representations of the selected set are displayed at a display element, providing for selection of content therefrom. An indication of selection of content is detected and used in subsequent set identification and display.

15 Claims, 3 Drawing Sheets

APPARATUS, AND ASSOCIATED METHOD, FOR FACILITATING CONTENT SELECTION

The present invention relates generally to a manner by which to facilitate ease of selection of content to be played out at an electronic device, such as a wireless device having media player functionality. More particularly, the present disclosure relates to an apparatus, and an associated method, by which to provide for display of multiple content streams from which selection of a content stream and content thereof is made for play out. The selection is used to reevaluate which content streams subsequently to display.

A viewer of content played out at the device is provided both with display of content streams amenable for selection of content to play out as well as updated content-stream display, where display selection is made taking into account prior content selection by the viewer.

BACKGROUND

Technological innovation has changed many aspects of modern society. New functions and services are now readily available to many that, until recently, were affordable only to a few or were not available to anyone. Advancements in communication technologies are exemplary of advancements that have permitted the development of new functions and services that are widely deployed and used by many.

The network infrastructures of cellular, and other analogous, wireless communication systems have been developed and deployed, now to encompass significant portions of the populated areas of the world. The cellular communication systems are used by many through which to communicate.

Early-generation, cellular communication systems generally provided primarily for voice communication services and provided only limited data communication services. Newer-generation, cellular communication systems provide for data-intensive communication services in addition to voice communication services. Communication of large-sized data files pursuant to performance of data-intensive communication services is permitted in various new-generation, cellular communication systems.

Communications are typically performed in a cellular communication system, as well as in analogous communication system, through use of portable wireless devices. Wireless devices that are used to carry out, or otherwise participate in, a communication service, are often times of small dimensions and weights. When of the small dimensions and weight, the wireless device is easily carried by a user, therefore to be available for use by the user pursuant to performance of a communication service. When the wireless device is carried, or otherwise transported together with the user, the wireless device is therefore available for use to perform, or participate in, a communication service, when desired, whenever the user, together with the wireless device, is positioned within an area encompassed by the network infrastructure of the communication system.

In addition to radio transceiver circuitry, wireless devices often times include additional functionality to perform additional communication, and other, services. The wireless device forms a multi-functional device, having multiple functionalities when the device is configured to include the additional functionalities. An exemplary functionality sometimes provided to a wireless device is a media player functionality. That is to say, a wireless device is sometimes provided with functionality to play out media content in human perceptible form. Audio, video, and multimedia content, depending upon the capability of the media player functionality, is able to be played out at the wireless device. Media play out functionality is sometimes also implemented at a stand alone, or other, device. A so-called MP3 player is exemplary of a media play out functionality, capable of playing out MP3-formatted content.

When implemented at a wireless device, the communication capability of the wireless device permits media content to be downloaded to the wireless device pursuant to a media service or play out at the wireless device. Media servers, and other network entities, are accessible from which to request the download of content or otherwise to cause downloading of content to the wireless device for subsequent play out, such as pursuant to a streaming media service, at the device.

Operation of the media player functionality at the wireless, or other electronic, device is typically under the control of a user of the wireless device, i.e., a viewer of the media content. The user of the wireless device is sometimes able to choose from amongst a large number of different media files for content to be played out at the device. Sometimes the user has difficulty in selecting the content for the reason that a user interface is unable to display all of the content available for selection and subsequent play out due to the small dimensions permitted of a user interface of the device together with the large number of media files typically available for selection.

Improvements to the existing art and solution of the existing problems would therefore be beneficial.

It is in light of this background information that the significant improvements of the present disclosure have evolved.

DETAILED DESCRIPTION

Figure 1:
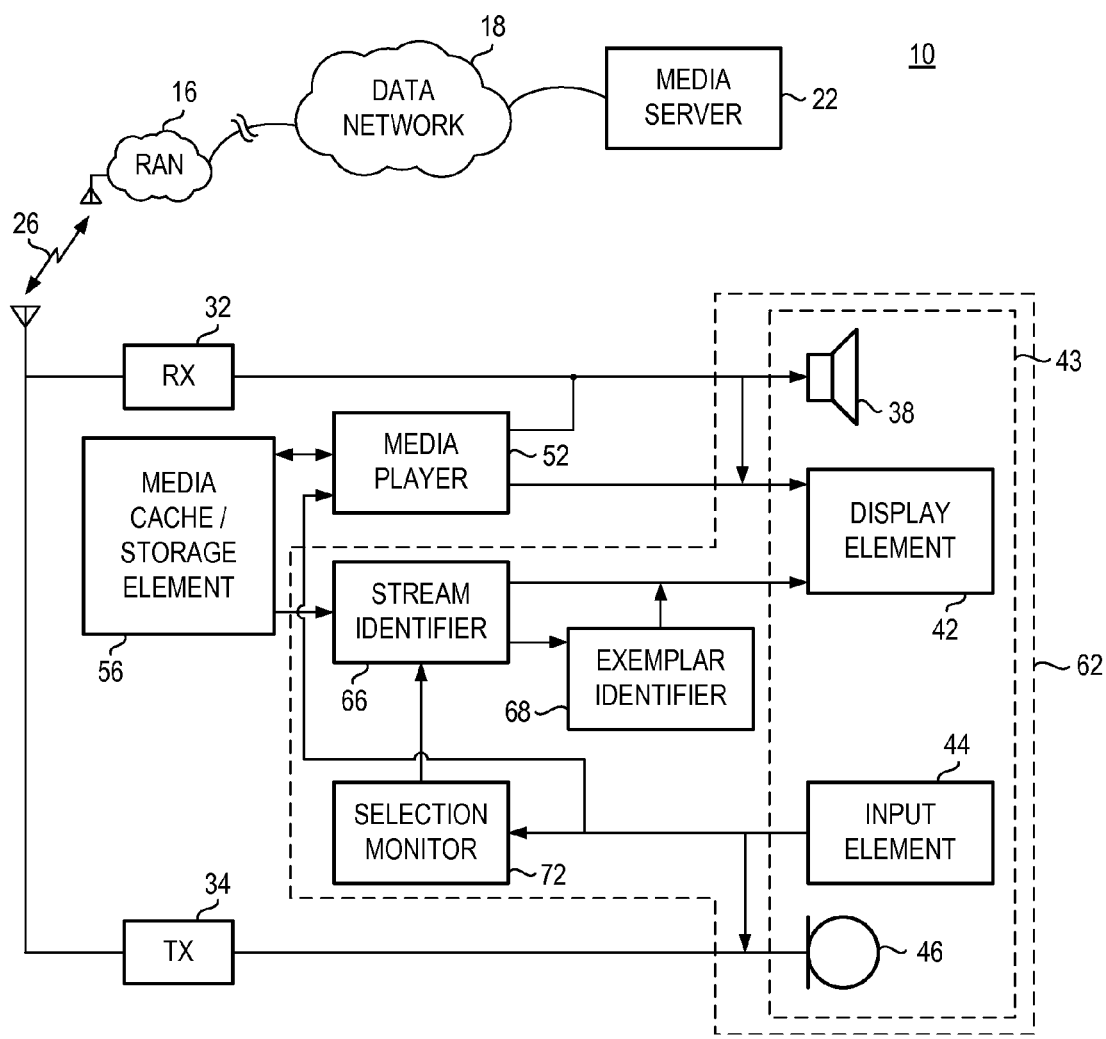
FIG. 1 illustrates a functional block diagram of a radio communication system in which an implementation of the present disclosure is operable.

The present disclosure, accordingly, advantageously provides an apparatus, and an associated method, by which to facilitate ease of selection of content to be played out at an electronic device, such as a wireless device having media player functionality.

Through operation of an implementation of the present disclosure, a manner is provided by which to provide for display of multiple content streams from which selection of a content stream and content thereof is made for play out. The selection is used to reevaluate which content streams subsequently to display.

In one aspect of the present disclosure, a viewer of content played out at the device is provided both with display of content streams that are amenable for selection for play out as well as updated display of content streams wherein the selection is made taking into account prior content selection by the viewer.

In another aspect of the present disclosure, content is configured into content streams, with each content stream having content of common content characteristics, such as content, categorized, e.g., by content performer, creator, genre, etc. The content streams are, e.g., network-sourced, i.e., sourced at a network entity and sent to the device. Or, the content forming the content streams is downloaded, or otherwise provided, to the wireless device and stored at the wireless device, subsequently to be accessible pursuant to media play out functionality of the device. Additionally, or alternately, recommendation of what content is to be included in each content stream is also network-sourced.

In another aspect of the present disclosure, content streams, each formed of media content, are identified. And, of the plurality of identified content streams, a set of content streams is identified. The set comprises one or more of the content streams that have content available for play out pursuant to a media play out function.

In another aspect of the present disclosure, indications of the set of content streams are provided to a display element. And, the display element displays representations of the provided indications. The set of content streams is, e.g., selected to be no greater than a selected number of content streams. That is to say, the set is constrained, e.g., to be no more than a set number of content streams. And, when so-constrained, the number of content streams displayed at the display element is correspondingly constrained to be no more than the maximum number of content streams. Thereby, a viewer of the display screen of the display element is able to see representations of the selected content streams and, in response to the display, to select for play out content of a selected content stream of the content streams identified by the displayed representations.

In another aspect of the present disclosure, identification is further made of an exemplar to be associated with each of the content streams. The exemplar is of any desired format or shape and provides a visual indication to facilitate viewer association of content to the associated content stream. And, alternative to use of an exemplar, or in addition to use of the exemplar, a label is utilized to indicate the content contained in the content stream.

In another aspect of the present disclosure, the viewer makes selection of content from a content stream of the set of content streams whose representations are displayed at the display element. The selection results in play out of the selected content or content stream. And, an indication of the selection made by the viewer is also utilized to reevaluate the content streams that are identified to form part of the set of content streams whose representations are displayed at the display element.

In another aspect of the present disclosure, a monitor monitors for a change in the current content. Such a change is indicative of selection by a viewer of the content that is to be played out at the media player of the device. The selection by the viewer comprises, e.g., selection of a different content stream, selection to skip to different content within a content stream, or termination of play out of current content, i.e., selection to play back the content to the end of the content. The monitor detects, thereby, an indication of the interest of the viewer in content of a content stream. The selection of the content or of the content stream identifies the type of content in which the viewer has interest. And, therefore, an indication of the selection is used in the reevaluation of the content streams to be identified subsequently as the set of content streams whose representations are to be displayed at the display element. Content streams that are identified include, e.g., content streams containing content that is likely to be of interest to the viewer. In one implementation, as subsequent selections are made by the viewer, further reevaluation and further identification of content streams to display are made further to refine the content streams displayed at the display element to include content streams likely best to correspond with the interest of the viewer.

Thereby, improved viewer experience is provided as the display of representations of content streams, and associated exemplars, are made to facilitate viewer selection of content.

In these and further aspects, therefore, an apparatus, and an associated method, is provided for facilitating content selection at an electronic device. A content stream identifier is configured to identify a set of content streams of a plurality of content streams having content available for play out at the electronic device. A display element is configured to display indication of each content stream of the set identified by the content stream identifier. A monitor is configured to detect indication of interest in content of a content stream displayed at the display element. The indication of interest is used in reevaluation by the content stream identifier of identification of the set of content streams of the plurality of content streams.

Referring first, therefore, to FIG. 1, a communication system, shown generally at 10, provides for communications with wireless devices, of which the wireless device 12 is representative. The communication system 10, in the exemplary implementation, comprises a cellular communication system that operates in general conformity with an operating specification of a cellular communication system standard. The communication system is more generally representative of any of various radio, and other, communication systems. While the following description shall describe exemplary operation in which the communication system comprises a cellular communication system, operation is analogous in other communication systems as well as implementations in which the device 12 forms a standalone device.

In the exemplary implementation in which the communication system 10 forms a cellular communication system, the network part of the communication system includes a radio access network (RAN) 16 and a data network 18, such as the internet. Communication entities are placed in communication connectivity with the data network 18. Here, a media server 22 is shown to be in communication connectivity with the data network 18.

The media server stores media content, such as media files forming audio media, video media, and multimedia content that is available for access, such as by downloading to wireless devices, here the wireless device 12. The media content is sent, e.g., responsive to request for the content or automatically. The media is routed through the data network 18 to the radio access network 16, and then upon radio channels 26 defined upon a radio air interface for delivery to the wireless device 12.

The wireless device includes transceiver circuitry, here represented by a receive (Rx) part 32 and a transmit (Tx) part 34. The receive part 32 receives information communicated to the wireless device, and the transmit part 34 transmits information sourced at the wireless device. The received information is transduced into human-perceptible form, here at an acoustic transducer 38 or at a visual display element 42. The transducer 38 and the display element 42 comprise elements of a user interface 43 of the device 12. The user interface further includes an input element 44 and an acoustic transducer 46, here a microphone.

The device 12 is a multifunctional device that includes functionality in addition to functionality provided for normal telephonic operation. Here, the wireless device further includes media player functionality, represented by a media player 52. When media player functionality is selected, the media player functions to play out media content for viewing, such as by a user of the wireless device. Media is selected for play out and the media is sourced, e.g., at a storage element 56. The storage element forms a streaming media source that sources media that is played out by the media player. Media content downloaded, such as by the media server 22, to the device 12 is detected by the receive part 32 and stored at the storage element.

As mentioned previously, large numbers of media content files might be available for play out by the media player. For instance, the storage element 56, if of large storage capacity, is capable of storing a large number of media files, any of which is selectable for play out. A viewer often times, conventionally, is unable easily to be made aware of the available content when large amounts of content are available for play out. A conventional mechanism that utilizes an alphabetical listing of the titles, or other indicia, of the stored content typically requires a viewer to scroll through the listing to locate content for selection and resultant play out.

The device 12 includes an apparatus 62 of an implementation of the present disclosure. The apparatus 62 facilitates selection of content to be played out pursuant to a media play out service at a device having media player functionality. The apparatus 62 is formed of elements that are functionally represented, implementable in any desired manner including, for instance, by hardware elements, firmware elements, algorithms executable by processing circuitry, and combinations thereof. Additionally, while in the exemplary implementation, the elements of the apparatus 62 are all shown to be implemented at the device 12, in other implementations, the elements are embodied at other entities or distributed across more than one entity.

The apparatus 62 includes a stream identifier 66, an exemplar identifier 68, a selection monitor 72, and the user interface 43. In operation, the apparatus 62 causes display, at a display element 42 of representations of selected content streams together with exemplars that are associated with the displayed content streams. The content streams, whose representations are displayed, are selected according to a selection criteria, and the selection is updatable responsive to reevaluation of by the apparatus of the selected content streams. Reevaluation is carried out to take into account selection of media content by the user or other viewer of the media content for play out.

Operation commences when selection is made by the user of the device to commence a media play out service. The selection is entered, e.g., by way of an input entered at the input element 44. Responsive to the selection to commence operation, the stream identifier performs operations to identify a set of content streams, formed of one or more media content files, of a plurality of content streams to display at the display element 42. The content streams are sourced, e.g., at the storage element 56 or remotely, such as that the media server 22. The stream identifier, in the exemplary implementation, identifies an initial set of content streams that are distinctive, i.e., that provide distinctive content. In an alternate implementation, the content streams identified by the content stream identifier are identified using, at least in part, information of prior play-out of media content.

The number of content streams included in the set of content streams is of any selected number, up to a maximum number of content streams. The number content streams that are identified to form the set that are displayed at the display element, in the exemplary implementation, permit representations of all of the content streams of the set to be displayed together at the display element.

For each content stream of the set identified by the stream identifier, the exemplar identifier 68 operates to identify an exemplar to be associated with the corresponding content stream. An exemplar comprises, for instance, an iconic representation of a content category or individual content file representative of the content category that would facilitate viewer comprehension of the associated content stream. Indications of the identified content streams and the associated, identified exemplars for the identified content streams are provided to the display element 42 for display thereat. In one implementation, a label is additionally, or alternately, displayed to indicate the content in the content stream.

A user, or other viewer, that views the displayed representations of the content streams of the identified set is able quickly to ascertain the content associated with the display content streams and to make selection therefrom.

Responsive to the displayed representations, the user or other viewer makes selection of content to play out pursuant to the media service. Selection is made by actuation of an appropriate input of the input element 44. Selection comprises, e.g., selection of a content stream, selection of particular content within a content stream, or selection, of play out of content to the end of the content and attendant indication of the play out to the end of the content. The selection is provided to the media player functionality 52 that, in turn, causes the selected media to be accessed at the storage element, or otherwise retrieved through, e.g., signaling with the media server 22 to cause downloading of the selected content. An indication of the selection is also provided to the selection monitor 72, either by way of the input element or by way of indications provided by media player functionality 52. The selection monitor monitors for the input, and when the indication of the input is detected, the monitor provides an indication of the detection to the stream identifier 66.

The stream identifier utilizes the selection indication for subsequent identification of content streams. That is to say, the set of content streams is updated, and the selection indication is used in the updating of the set. The updated, i.e., new, reevaluated, or newly identified, set is to be included in the set of content streams that are displayed at the display element 42 and available for quick selection by a viewer of the displayed representations of the streams. By taking into account the selection of media input by way of the input element 44, the streams are tailored to the content related to the prior content selection or selections. Thereby, content streams most appropriate for the user are displayed, facilitating selection of desired content and improving the experience of the user with respect to the media service.

Figure 2:
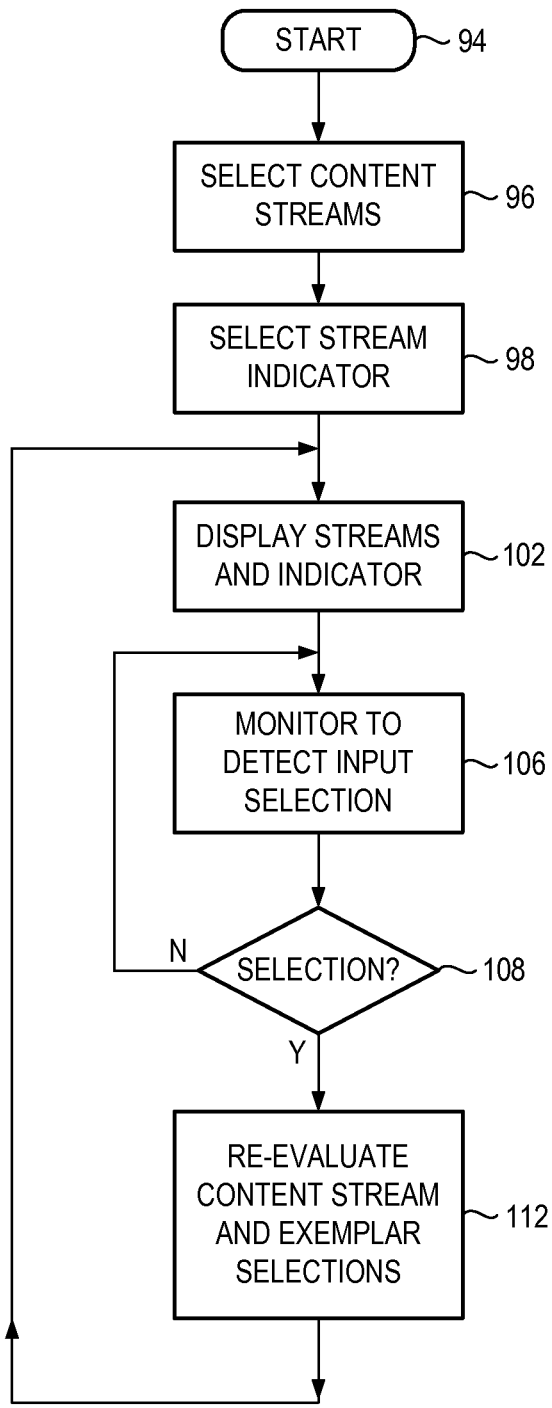
FIG. 2 illustrates a process diagram representative of the process of operation of an implementation of the present disclosure.

FIG. 2 illustrates a process 92 representative of the process of operation of an implementation of the present disclosure. The process provides for display of representations of content streams, and content therein, that is available for play out pursuant to a media service.

First, subsequent to entry at the start block 94, content streams are selected, or otherwise identified, to form a set of content streams, indicated by the block 96. The set of content streams is selected from a plurality of content streams that are to be highlighted to a user of a wireless, or other electronic, device that has media play out functionality. The content streams selected to be members of the set of content streams are selected, e.g., to be distinctive from one another or are based upon historical content selection.

Then, for each content stream identified to be a member of the set of content streams, an exemplar is selected, indicated by the block 98. The exemplar is, for instance, an iconic representation of a category type of the content of the content stream or indications of individual content files of the content stream.

Then, and as indicated by the block 102, the selected content streams and the associated exemplars are displayed at a display element. A user is able to view the representations of the content streams when displayed at the display element.

Then, and as indicated by the block 106 monitoring is performed to detect input selection of a content stream of the displayed content-stream representations.

A determination is made, indicated at the decision block 108, as to whether selection has been made. If not, the no branch is taken back to the block 106, and monitoring continues. If, conversely, selection has been made, the yes branch is taken to the block 112. At the block 112, reevaluation of the content streams and associated exemplars that are to be included in subsequent content-stream-set displays is under taken. And, once selected, a branch is taken back to the block 102 and the representations of newly-selected content streams for display are displayed.

Figure 3:
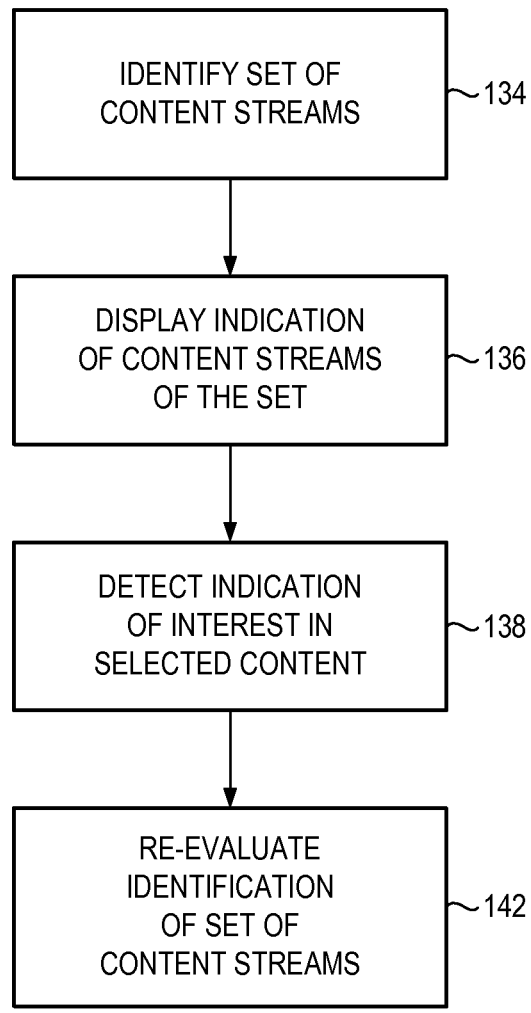
FIG. 3 illustrates a method flow diagram representative of the method of operation of an implementation of the present disclosure.

FIG. 3 illustrates a method flow diagram 132 representative of the method of operation of an implementation of the present disclosure. The method facilitates content selection at an electronic device.

First, and as indicated by the block 134, a set of content streams of a plurality of content streams having content available for play out is identified. Then, and as indicated by the block 136, an indication of each content stream of the identified set is displayed.

Thereafter, and as indicated by the block 138, indication of interest in content of a displayed content stream is detected. And, as indicated by the block 142, identification of the set of content streams is reevaluated responsive to the detected indication of interest.

Thereby, multiple content streams of content are represented and updated to present a user with content streams of content, based upon prior selection, considered most likely to be of interest to the user.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for facilitating content selection at an electronic device, said apparatus comprising:
   a content stream identifier configured to identify a set of content streams of a plurality of content streams having content available for play out at the electronic device;
   a display configured to display an indication of each content stream of the set of content streams identified by said content stream identifier;
   a monitor configured to detect selection of a displayed indication of a content stream displayed at said display;
   wherein the content stream identifier is further configured to identify an updated set of content streams from the plurality of content streams, the updated set of content including content related to content played out in response to the selection of the displayed indication; and
   wherein the display is further configured to display an indication of each content stream in the updated set of content streams.

2. The apparatus of claim 1 wherein said display is further configured to display an exemplar associated with each content stream of the set identified by said content stream identifier.

3. The apparatus of claim 2 further comprising an exemplar identifier configured to identify the exemplar associated with each content stream of the set of content streams.

4. The apparatus of claim 3 wherein the selection detected by said monitor is further used by said exemplar identifier to identify an exemplar associated with each content stream in the updated set of content streams.

5. The apparatus of claim 1 wherein the selection detected by said monitor comprises an indication of selected media content to be played out at the electronic device.

6. The apparatus of claim 5 further comprising a media player configured to play out the selected media content.

7. The apparatus of claim 1 wherein said content stream identifier is configured to identify the set of content streams as having distinctive content categories.

8. The apparatus of claim 7 wherein the updated set of content streams comprises updated content categories.

9. A method for facilitating content selection at an electronic device, said method comprising:
   identifying a set of content streams of a plurality of content streams having content available for play out at the electronic device;
   displaying an indication of each content stream of the set of content streams identified during said identifying; and
   detecting selection of a content stream displayed during said displaying; and
   identifying an updated set of content streams from the plurality of content streams, the updated set of content streams comprising content related to content played out in response to the selection; and
   displaying an indication of each media content stream of the updated set of content streams.

10. The method of claim 9 wherein said detecting comprises detecting selection of a content stream for play out at the electronic device.

11. The method of claim 9 wherein said displaying an indication of each content stream of the set of content streams further comprises displaying an exemplar associated with each content stream of the set of content streams identified during said identifying.

12. The method of claim 11 further comprising identifying the exemplar associated with each content stream of the set of content streams.

13. The method of claim 12 further comprising identifying an exemplar associated with each content stream in the updated set of content streams using the selection detected during said detecting.

14. The method of claim 9 wherein the selection detected during said detecting comprises an indication of media content to be played out at the electronic device.

15. The method of claim 9 wherein said identifying a set of content streams comprises identifying the set of content streams as having distinctive content categories.

* * * * *